United States Patent
Bushel et al.

(10) Patent No.: US 7,530,013 B2
(45) Date of Patent: May 5, 2009

(54) OPTIMIZER OF INTERDEPENDENT INFORMATION

(75) Inventors: Alexander Bushel, Fair Lawn, NJ (US);
Arkadi Relin, Langhorne, PA (US);
Sergey Komarov, Kiev (UA)

(73) Assignee: Ultimate Risk Solutions, LLC, Owings Mills, MD (US)

( * ) Notice: Subject to any disclaimer, the term of this patent is extended or adjusted under 35 U.S.C. 154(b) by 0 days.

(21) Appl. No.: 10/461,310

(22) Filed: Jun. 13, 2003

(65) Prior Publication Data

US 2004/0255238 A1 Dec. 16, 2004

(51) Int. Cl.
*G06F 15/00* (2006.01)
*G06F 9/44* (2006.01)
*G06F 17/00* (2006.01)

(52) U.S. Cl. .................. 715/212; 715/248; 715/255; 717/151; 707/2; 707/7

(58) Field of Classification Search ............. 715/503, 715/504, 212, 213, 217, 219, 220, 229, 255, 715/267, 273; 707/3, 1, 2, 4, 7, 100, 104.1, 707/203, 205; 717/100, 106, 108, 120, 131, 717/136, 137, 139, 143, 149, 151, 153, 154
See application file for complete search history.

(56) References Cited

U.S. PATENT DOCUMENTS

| 5,471,612 | A  | * | 11/1995 | Schlafly ................. 715/503 |
| 6,766,512 | B1 | * | 7/2004  | Khosrowshahi et al. ..... 715/504 |
| 7,010,779 | B2 | * | 3/2006  | Rubin et al. ............. 717/106 |
| 2002/0059203 | A1 | * | 5/2002 | Witkowski et al. .......... 707/3 |
| 2004/0133567 | A1 | * | 7/2004 | Witkowski et al. .......... 707/3 |
| 2004/0205521 | A1 | * | 10/2004 | Geuss et al. ............. 715/503 |
| 2004/0205524 | A1 | * | 10/2004 | Richter et al. ........... 715/503 |

OTHER PUBLICATIONS

Raman et al., "Online Dynamic Reordering," ACM, 2000, pp. 247-260.*
Reichwein et al., "Slicing Spreadsheets: An Integrated Methodology for Spreadsheet Testing and Debugging," ACM, 1999, pp. 25-38.*

* cited by examiner

*Primary Examiner*—Doug Hutton
*Assistant Examiner*—Maikhanh Nguyen
(74) *Attorney, Agent, or Firm*—Gottlieb, Rackman & Reisman

(57) ABSTRACT

An optimizer of interdependent information for storing fragments of interdependent information based on their sequential interdependence, and input and output parameters based on address information about zones of location of input and output information of the interdependent information. Dynamic processing of interdependent information is enabled by translation and storage of information about the fragments of the interdependent information.

17 Claims, 1 Drawing Sheet

OPTIMIZER OF INTERDEPENDENT INFORMATION

FIELD OF THE INVENTION

This invention relates to the systems that implement various methods of transformation of the collections of interdependent information. Usually, such information is inputted and stored in the form of its fragments within various systems, such as, for example, "electronic spreadsheet"-type systems. The need to transform such interdependent information arises in many cases in the context of the tasks of executing high speed frequently repetitive calculating operations. Such tasks arise from the need to perform large number of calculations during the short time intervals.

BACKGROUND OF THE INVENTION

The known systems of input and storage of interdependent information, such as "electronic spreadsheet"-type systems, do not allow to directly attain high speed of calculating operations when such calculating operations are repeated many times during the short time interval. Thus the use of such systems interacting directly with the external systems of dynamic processing of interdependent information considerably limits the efficiency of performance of the latter systems.

SUMMARY OF THE INVENTION

The above main disadvantages of such known systems of input and storage of interdependent information arise from the fact that their functional structure assumes the execution of repetitive process of identification of dependencies, preparation and use of the entire interdependent information, respectively, at each and every step of repetitive calculating operations.

The objective of this invention is introducing an Optimizer of Interdependent Information, principle of construction of which allows realization of new methodological approaches in the implementation of the processes of ordering reading and transformation of the collection of fragments of interdependent Information. Note that the introduced Optimizer ensures the preparation of said information into the type and form convenient for the efficient execution of the subsequent high speed repetitive calculating operations.

The fundamentally new capabilities of the introduced Optimizer are made possible because it combines the Information Reading and Ordering Subsystem, the Translation Subsystem, and the Information Zones Assignment Unit. Said combination in the Optimizer's functional structure, together with its internal functional links and its external links to the external System of Input and Storage of Interdependent Information and to the external System of Dynamic Processing of Interdependent Information, provides fundamentally new kind of channel of communication and transformation between said external systems of input and storage of interdependent information and its dynamic processing.

The illustrative embodiment comprises a method of optimizing a spreadsheet that is characterized by a plurality of cell formulas and their interdependence, the method comprising: reading a plurality of cell formulas and their interdependence; and transforming the cell formulas and their interdependence into a sequence of instructions.

DETAILED DESCRIPTION

Figure 1:
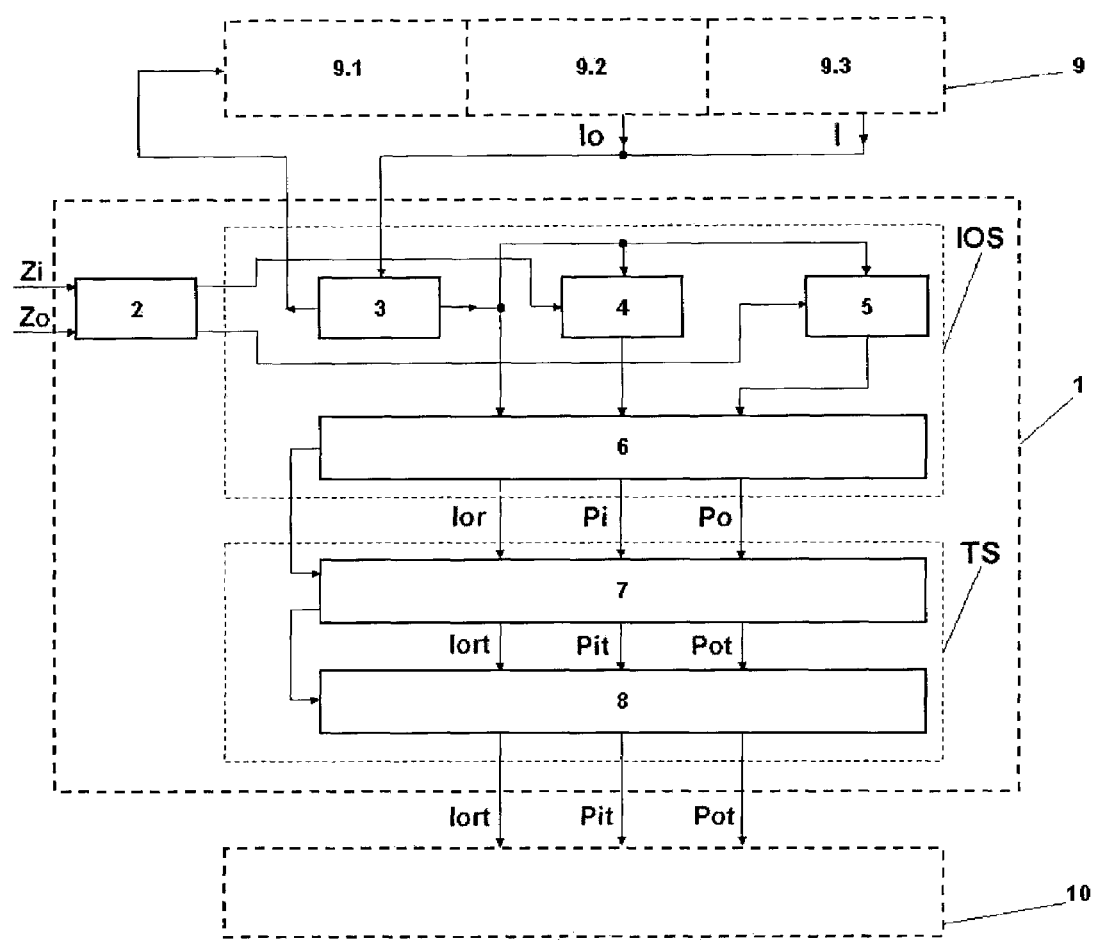
FIG. 1 shows one possible version of a block diagram of the functional structure of Optimizer of Interdependent Information.

FIG. 1 shows one possible version of a block diagram of the functional structure of Optimizer of Interdependent Information. Optimizer 1 contains the Information Zones Assignment Unit 2, the Unit of Ordering Reading of Information 3, the Input Information Identification Unit 4, the Output Information Identification Unit 5, the Memory Unit 6, the Translation Unit 7, and the Memory Unit 8. The Information Zones Assignment Unit 2 has two assignment inputs and two corresponding outputs. The Unit of Ordering Reading of Information 3 has the control output, the data output and the data input. Input Information Identification Unit 4 has the assignment input connected to the first output of Unit 2, the data input connected to the data output of Unit 3, and the data output. Output Information Identification Unit 5 has the assignment input connected to the second output of Unit 2, the data input connected to the data output of Unit 3, and the data output. The Memory Unit 6 has three data inputs connected to respective data outputs of Units 3, 4, 5. The Unit 6 also has three data outputs and the control output. The Translation Unit 7 has three data inputs connected to the corresponding data outputs of Unit 6 and the control input connected to the control output of Unit 6. Moreover, the Unit 7 has three data outputs and the control output. The Memory Unit 8 has three data inputs connected to the corresponding data outputs of Unit 7 and the control input connected to the control output of Unit 7. Moreover, the Unit 8 has three data outputs.

The above listed Units 3, 4, 5, and 6 together with their external and internal functional links comprise the Information Reading and Ordering Subsystem IOS of the described Optimizer 1. The Units 7 and 8 together with their external and internal functional links comprise the Translation Subsystem TS of the described Optimizer 1. The control output and the data input of Unit 3, as well as three data output of Unit 8 comprise the structure of external communication links of the described Optimizer 1. With this, the control output of Unit 3 is connected to the control input of the external System of Input and Storage of Interdependent Information 9, while the data input of Unit 3 is connected to the data output of System 9. The example of the System 9 can be the system of input and storage of interdependent information of "electronic spreadsheet"-type. Note that such "electronic spreadsheet"-type System 9, may, as a rule, have several information zones: Input Information Zone 9.1, Interdependent Output Information Zone 9.2, and Interdependent Main Information Zone 9.3. Note that, when the "electronic spreadsheet"-type system is used, the information zones 9.2 and 9.3 have the data outputs that may, in reality, be combined into the single data output of System 9, to which the data input of Unit 3 may connect. The data outputs of Unit 8 are connected to the corresponding inputs of the external System of Dynamic Processing of Interdependent Information 10.

The introduced Optimizer of Interdependent Information 1 shown on FIG. 1 performs the function of optimization of interdependent information inputted and stored in the external System 9 with the purpose of transforming said information into the type and form optimal for the dynamic processing performed by the external System 10. Thus the Optimizer is intended to ensure an independent process optimizing the possibility of using the entire collection of the fragments of interdependent information, inputted into the System 9, by the system of dynamic processing 10. Said process is implemented in the Optimizer as follows.

Prior to the commencement of work of the Optimizer 1, the operator inputs into the Unit 2, through its assignment inputs, the information, respectively, Zi—about the zone of location of input information 9.1 within the System 9, and Zo—about the zone of location of output information 9.2 within the System 9. Note that the information zone 9.2 contains the interdependent output information Io, while the information zone 9.3 contains the main collection of interdependent information I. The entire collection of fragments of said interdependent information Io and I is inputted by the operator into the "electronic spreadsheet"-type system in advance taking into account the zoning of said system. Also note that the operator inputs each fragment of said collection of interdependent information into its respective cell within the restricted zones of the "electronic spreadsheet"-type system 9. Such information is inputted into the System 9 with the purpose of its subsequent use during the execution of the frequently repetitive calculating operations.

After this, a command is issued from the Unit 3, through its control output, to the System 9 to begin reading the fragments of interdependent information from its information zones, respectively, 9.2 and 9.3. The read information Io and I is sent to the data input of Unit 3. During this, the Unit 3 interacting with the "electronic spreadsheet" performs the ordering reading of the fragments of the collection of interdependent information located in their respective cells of the "electronic spreadsheet". Note that the process of ordering of said information is performed in the Unit 3 by means of step-by-step identification and ordering of said fragments of the collection of interdependent information based on their sequential interdependence in the cells of the "electronic spreadsheet". Simultaneously with the execution of the process of ordering reading of interdependent information in the Unit 3, from its data output said information is sent to the data inputs of Units 4 and 5, respectively. Also, the information from the outputs of Unit 2, respectively, Zi and Zo, is sent to the assignment inputs of Units 4 and 5. Note that the Input Information Identification Unit 4, during the processing of the entire collection of the fragments of interdependent information, performs the analysis of said collection taking into account the addresses of the input information Zi and identifies, step-by-step, those fragments of interdependent information that contain the input parameters Pi. At the same time, the Output Information Identification Unit 5, during the processing of the entire collection of the fragments of interdependent information, performs the analysis of said collection taking into account the addresses of the output information Zo and identifies, step-by-step, those fragments of interdependent information that contain the output parameters Po. The information from data outputs of Units 3, 4, and 5 is continuously sent to the data inputs of Memory Unit 6. Upon completion of the above described processes in the Units 3, 4, and 5, the Unit 6 memorizes the ordered collection of the fragments of interdependent information Ior as well as the fragments containing the input parameters Pi and the fragments containing the output parameters Po. Said information memorized in Unit 6 is sent to its three data outputs. At the same time, from the control output of Unit 6, a command is sent to the control input of the Translation Unit 7. The Unit 7 commences the process of transformation (translation) of the information sent to its data inputs from the data outputs of Unit 6. Note that the information sent to Unit 7 is transformed into the type that is optimal for its subsequent high-speed use in calculating operations. For example, such transformation may involve the known principles of conversion (translation) of the ordered fragments of interdependent information into the computer machine code that allows the execution of high-speed calculating operations with their possible multiple dynamic recurrence. After the completion of the transformation (translation) process, the information Ior, Pi and Po, transformed into analogous, but of the new type, translated information, respectively, Iort, Pit and Pot, is sent from the corresponding data outputs of Unit 7 to the data inputs of Memory Unit 8. The Memory Unit 8, upon a command issued from the Unit 7 to the control input of said Unit 8, memorizes all said translated information. The translated ordered interdependent information Iort, the translated information about the input parameters Pit, and the translated information about the output parameters Pot are sent from the data outputs of Unit 8 to the corresponding inputs of the external System of Dynamic Processing of Interdependent Information 10.

The entire collection of translated interdependent information Iort, as well as the translated information about the input parameters Pit and the translated information about the output parameters Pot, may be used in the external System 10 during the process of executing of the high-speed calculating operations by said System 10. Note that for the purpose of solving the various tasks the process of said calculating operations may be repeated multiple times in the System 10 with the changing values of the input parameters.

It should be noted that the Unit of Ordering Reading of Information 3 may implement several alternatives of possible processes of ordering reading of the fragments of the collection of interdependent information located in their respective cells of the "electronic spreadsheet". With this, the step-by-step identification and ordering of said fragments of the collection of interdependent information based on their sequential interdependence in the cells of the "electronic spreadsheet" may be implemented:

from the fragments containing the output parameters in the priority order and in the direction along the interdependence chain towards the fragments containing the input parameters;

from the fragments containing the input parameters in the priority order and in the direction along the interdependence chain towards the fragments containing the output parameters;

from any fragment in two directions along the interdependence chain, both towards the fragments containing the input parameters and towards the fragments containing the output parameters;

also, the other possible processes that utilize combined (from above described) approaches may be implemented.

Depending on the specifics of interdependencies in the collection of the fragments of interdependent information of the "electronic spreadsheet", which is read and ordered by the Unit 3, one or several different chains produced from the interdependent fragments of the of said collection may be formed. Note that the Memory Unit 6 memorizes all chains of interdependent fragmented information produced by the Unit 3. The storing of said chains in the Unit 6 allows the Translation Unit 7 to take into account such structuring arrangements of interdependent information and transform said information into the analogous form, but in the new translated type, optimal for the subsequent high-speed calculations.

Therefore, the fundamentally novel methodological approach of optimization of the collection of the fragments of interdependent information implemented by the functional units of Optimizer 1 provides radically new possibilities in optimization and transformation of said information. The combination of functional units and their internal links, forming the Information Reading and Ordering Subsystem IOS, together with the capability of the Information Zones Assignment Unit 2, as well as with the external links to the "electronic spreadsheet"-type Systems of Input and Storage of Interdependent Information 9 provides an entirely new capability of preparation of interdependent information for its subsequent transformation (translation). Such novel approach makes possible the preparation of a combination of several characteristics related to the used collection of the fragments of interdependent information simultaneously. The latter provides the possibility of implementing the most efficient process of the transformation (translation) of said information into the type optimal for its subsequent dynamic processing.

Fundamentally new principles of construction and capabilities of the introduced Optimizer of Interdependent Information warrant its wide application in various systems, especially those related to the need to perform high-speed calculations repeated multiple times using large collections of various interdependent information It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. In a computer having a processor running a spreadsheet containing interdependent information and including an input zone of location containing input information (9.1) and an output zone of location, and an external system of dynamic processing of interdependent information having external inputs, a computer program imbedded in an electronically readable medium and executable on said computer for optimizing interdependent information contained within said spreadsheet, comprising:

an information reading and ordering subsystem (IOS) receiving input data related to information in the input zone of location and the output zone of location, and using said data to retrieve from the spreadsheet and outputting internal output data corresponding to said input data, said internal output data including ordered collections of fragments of interdependent information; and a translation subsystem receiving internal output data, translating said internal output data into external output data including interdependent translated information and outputting said external output data to the external inputs of the external system of dynamic processing of interdependent information, wherein said computer program performs the steps of:

inputting into said input zone of location, first information (Zi) about the zone of location of input information (9.1) within the spreadsheet and second information (Zo) about the zone of location of output information (9.2) within the spreadsheet, wherein the zone of location of output information (9.2) contains the interdependent output information (Io), and an interdependent information zone (9.3) which contains the main collection of interdependent information (I), wherein the fragments of interdependent information are read from the zone of location of output information (9.2) and from the interdependent information zone (9.3), and wherein the ordering of the information is performed by means of step-by-step identification and ordering of said fragments of the collection of interdependent information is based on their sequential interdependence in the cells of the spreadsheet, analyzing said collection of interdependent information, taking into account the addresses of the first information (Zi), identifying, step-by-step, those fragments of interdependent information that contain input parameters (Pi)

performing the analysis of said collection, taking into account the addresses of the second information (Zo) and identifying, step-by-step, those fragments of interdependent information that contain output parameters (Po), sending to a first memory unit the ordered collection of the fragments of interdependent information (Ior), as well as the fragments containing input parameters (Pi) and the fragments containing output parameters (Po), transforming the information sent to the first Memory Unit into the type that is optimal for its subsequent high-speed use in calculating operations, storing the transformed information in a second memory unit, sending the transformed information from the second memory unit to an external system of dynamic processing of interdependent information, and executing high-speed calculating operations by said system, wherein for the purpose of solving the various task the process of said calculating operations is repeated multiple times in the system with changing values of the input parameters.

2. The computer program of claim 1 wherein said information reading and ordering subsystem (IOS) includes a unit of ordering reading of information (3); an input Information Identification Unit (4), an Output Information Identification Unit (5), and a Memory Unit (6), wherein said unit of ordering information requests the information from said spreadsheet, orders said information in a predetermined order and feeds the same to said Identification Units.

3. The computer program of claim 2 wherein internal output data includes interrelation information (Ior), input parameters (Pi) and output parameters (Po) and wherein said translating subsystem translates said internal output data into external output data including corresponding interdependent translated information (Iort), translated input parameters (Pit) and translated output parameters (Pot).

4. The computer program of claim 3 wherein said interrelation information (Ior), input parameters (Pi) and parameters (Po) are extracted from said internal output information by said unit of ordering reading of information (3), input Information Identification Unit (4), an Output Information Identification Unit (5), respectively and stored in said internal memory unit (6).

5. The computer program of claim 4 wherein the said Unit of Ordering Reading of Information (3) has a control output and a data input, that also serve as, respectively, an external control output and an external data input of said Information Reading and Ordering Subsystem (IOS) for ordering and retrieving information from said spreadsheet.

6. The computer program of claim 2 further comprising an information zones assignment unit receiving input and output zones assignment information for said input and output location zones of the spreadsheet.

7. The computer program of claim 6 wherein information zones assignment unit outputs an assignment input (Zi) and an assignment output (Zo); wherein said Input Information Identification Unit (4) receives said assignment input (Zi) regarding the information about the input zone of location (9.1); and wherein said Output Information Identification Unit (5) receives said assignment output (Zo) regarding information about the output zone of location (9.2).

8. The computer program of claim 1 wherein said Translation Subsystem (TS) comprises a Translation Unit (7) and a Memory Unit (8).

9. The computer program of claim 1 wherein:
said Unit of Ordering Reading of Information (3) implements a process of reading fragments of the collection of interdependent information located in respective cells of the spreadsheet (9) with simultaneous step-by-step identification and ordering of said fragments based on their sequential interdependence in the cells of said spreadsheet by means of implementing said step-by-step identification from the fragments containing the output parameters in the priority order and in the direction along the interdependence chain towards the fragments containing the input parameters.

10. The computer program of claim 1 wherein:
the Unit of Ordering Reading of Information (3) implements a process of reading of the fragments of the collection of interdependent information located in respective cells of the spreadsheet; a simultaneous step-by-step identification and ordering of said fragments based on their sequential interdependence in the cells of the spreadsheet; said process being performed by implementing said step-by-step identification from the fragments containing the input parameters in the priority order and in the direction along the interdependence chain towards the fragments containing the output parameters.

11. The computer program of claim 10 wherein:
said step-by-step identification is taken from any fragment in two directions along the interdependence chain, both towards the fragments containing the input parameters and towards the fragments containing the output parameters.

12. A computer-implemented method of using spreadsheet logic for fast dynamic processing of information stored in information zones of a spreadsheet, said information comprising input information, interdependent output information (Io) and a main collection of interdependent information (I), said method comprising the steps of:
inputting into an information zones assignment unit (2), first information (Zi) about the zone of location of input information (9.1) within the spreadsheet, and second information (Zo) about the zone of location of output information (9.2) within the spreadsheet,
wherein the zone of location of output information (9.2) contains the interdependent output information (Io), and an interdependent information zone (9.3) contains the main collection of interdependent information (I),
reading of the fragments of interdependent information from the zone of location of output information (9.2) and the interdependent information zone (9.3),
wherein the ordering of the information is performed by means of step-by-step identification and ordering of said fragments of the collection of interdependent information based on their sequential interdependence in the cells of the spreadsheet,
analyzing said collection of interdependent information, taking into account the addresses of the first information (Zi),
identifying, step-by-step, those fragments of interdependent information that contain input parameters (Pi)
performing the analysis of said collection taking into account the addresses of the second information (Zo) and identifying, step-by-step, those fragments of interdependent information that contain output parameters (Po),
sending to a first memory unit the ordered collection of the fragments of interdependent information (Ior) as well as the fragments containing the input parameters (Pi) and the fragments containing the output parameters (Po),
transforming the information sent to the first Memory Unit into the type that is optimal for its subsequent high-speed use in calculating operations,
storing the transformed information in a second memory unit,
sending the transformed information from the second memory unit to an external system of dynamic processing of interdependent Information (10), and
executing high-speed calculating operations by said system (10),
wherein for the purpose of solving the various tasks the process of said calculating operations is repeated multiple times in the system (10) with changing values of the input parameters.

13. The method of claim 12 wherein:
the transformation is conversion of the ordered fragments of interdependent information into a computer machine code and the execution of high-speed calculating operations with multiple dynamic recurrence.

14. The method of claim 12 wherein:
said method is implemented from the fragments containing the output parameters in the priority order and in the direction along the interdependence chain towards the fragments containing the input parameters.

15. The method of claim 12 wherein:
said method is implemented from the fragments containing the input parameters in the priority order and in the direction along the interdependence chain towards the fragments containing the output parameters.

16. The method of claim 12 wherein:
said method is implemented from any fragment in two directions along the interdependence chain, both towards the fragments containing the input parameters and towards the fragments containing the output parameters.

17. The method of claim 12 wherein:
depending on the specifics of interdependencies in the collection of the fragments of interdependent information of the "electronic spreadsheet", which is read and ordered, one or several different chains produced from the interdependent fragments of the of said collection is formed.

* * * * *